Apr. 10, 1923.  
L. C. A. DE B. DOUCET  
1,451,294  
FIREARM FOR TEACHING OR PRACTICING THE AIMING THEREOF, AND FOR ADAPTING THE SAME FOR SIGNALING  
Filed Dec. 14, 1920
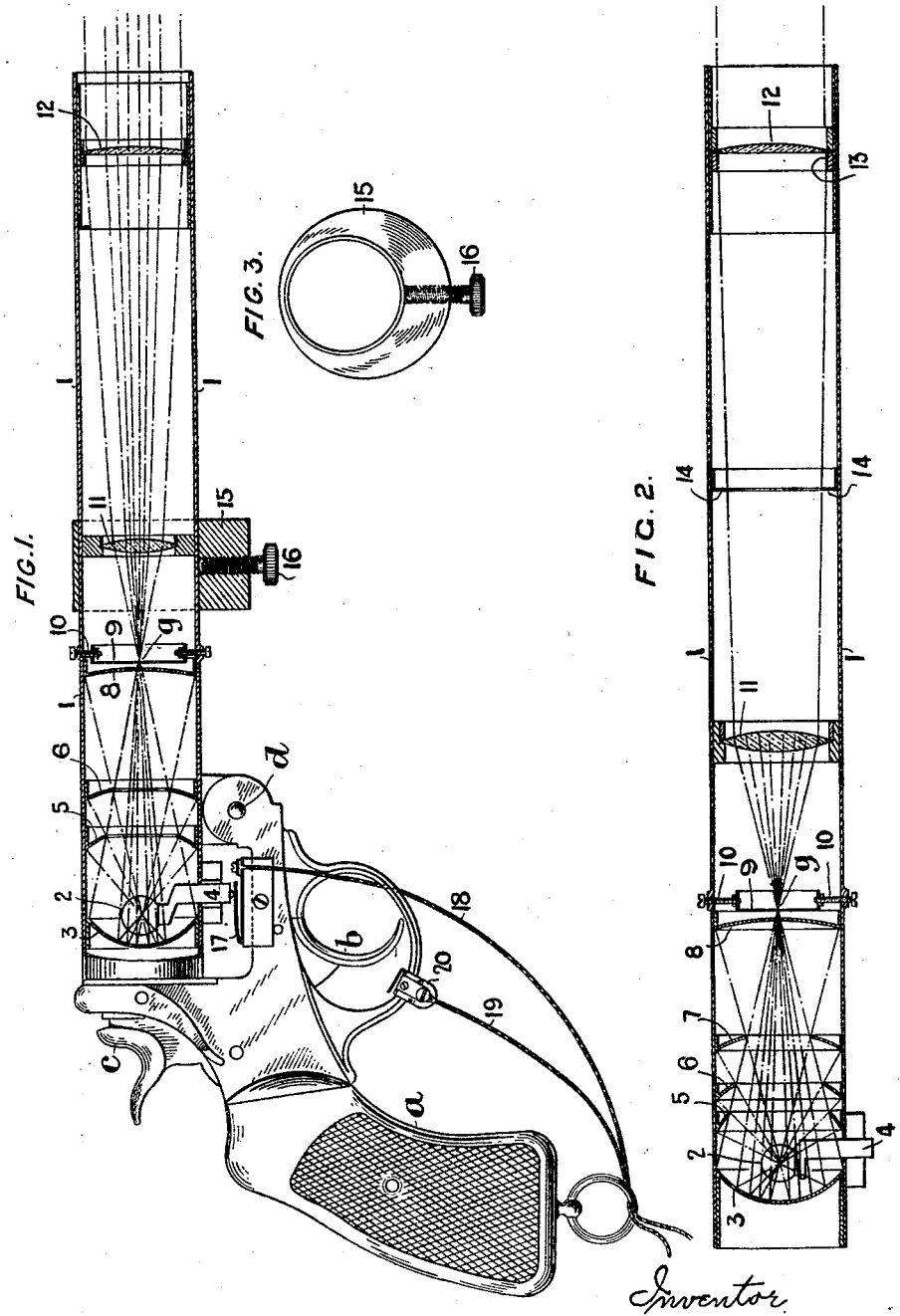

Patented Apr. 10, 1923.

1,451,294

UNITED STATES PATENT OFFICE.

LOUIS CLAUDE ALEXANDRE DE BRIGNY DOUCET, OF LONDON, ENGLAND.

FIREARM FOR TEACHING OR PRACTICING THE AIMING THEREOF, AND FOR ADAPTING THE SAME FOR SIGNALING.

Application filed December 14, 1920. Serial No. 430,799.

*To all whom it may concern:*

Be it known that I, LOUIS CLAUDE ALEXANDRE DE BRIGNY DOUCET, a subject of the King of Great Britain, residing at The Junior United Service Club, Charles Street, London, S. W. 1, England, have invented certain new and useful Improvements in and Connected with Firearms for Teaching or Practicing the Aiming Thereof, and for Adapting the Same for Signaling, of which the following is a specification.

This invention comprises improvements in and connected with fire-arms for teaching and practicing the aiming thereof, and for adapting the same for signaling. The invention is applicable to fire-arms of all kinds, but particularly to automatic pistols, revolvers, rifles, shot guns, automatic rifles, and like small arms or dummy representations thereof.

The object of the invention is to provide means which are primarily adapted for the teaching or practice of snap shooting or quick and accurate aiming without the use of sights. In warfare, during twilight attacks, at dawn or evening, or during night raids or engagements, it is not always possible for the soldier to use the sights of his firearm. In the training of marksmen as heretofore carried out, the firing is done by aiming over the sights at a well-illuminated object, and there has been little opportunity for effectually training men to fire at badly illuminated objects or without the use of the sights. Moreover, there has been no ready and inexpensive means for enabling the accuracy or otherwise of twilight or night firing to be determined. In any event the firing off of ball cartridge involves considerable expense.

Now according to this invention, the firearm, which may be an effective weapon or a dummy, is fitted with means for projecting a beam of light when "fired" and the illumination of the object or target, or the disc or spot light produced by such beam affords an adequate means for determining the accuracy or otherwise of the aim. The means for projecting the beam advantageously comprises a tube fitted with lenses, reflectors, or a combination thereof, and a source of light, preferably in the form of a small electric lamp or bulb. This tube may be clamped or fastened to the barrel of a service or other fire-arm and adjusted to accurate relation with the sights of such fire-arm, or it may be a tube or a barrel of a dummy fire-arm adapted for teaching or practice uses only. Or the tube may be adapted so that it may be fitted to the fire-arm in substitution of the barrel of the latter, and so that the tubular projector may be readily exchanged for the barrel, or vice versa, or the tube or portions thereof may be placed in the bore of the arm proper. The electric lamp may be switched in only at the moment of "firing," or a source of light may be normally obscured by a shutter which is operated to permit of the projection of the beam at that moment.

In order to enable this invention to be readily understood, reference is made to the accompanying drawing, in which:—

Figure 1 is a sectional side elevation of a revolver of the Webley pattern having a tubular light projector substituted for the ordinary barrel and Figure 2 is a longitudinal section of a slightly modified tubular projector, illustrating the principle of light projection and control.

Figure 3 is a front elevation of the tubular casing seen in Figure 1 and of the adjustable weight thereon.

Referring to Figure 1, $a$ is the butt or handle of a revolver with trigger $b$ and hammer $c$, and in place of the usual barrel or revolving chamber there has been fitted the tubular casing 1 of a light projector having the same length as the barrel which has been removed. The casing 1 is shown fitted with an adjustable weight 15 which may consist of an eccentrically perforated disc movable along the casing 1 and secured in any desired position thereon by a clamping screw 16 or other suitable means. This weight is for the purpose of making the weight of the light projector the same as that of the barrel for which it is the substitute, and the adjustment enables the same position for the centre of gravity to be arrived at as was possessed by the pistol when fitted with a barrel or chamber. The casing 1 may be formed or fitted at its rear end so that it may be substituted for the barrel of a chosen make of fire-arm. For example, it may have the "lump" fitting for enabling it to be substituted for the barrel of a Webley revolver, or it may be adapted to slide on and off the stock or frame as in the case of a Browning, Mauser or similar recoil acting fire-arms. In the construction illustrated, the end of the tubular projector is fitted with means for attaching it to the pivotal mounting $d$ on the stock. A small electric lamp bulb 2 is supported centrally of the casing 1 near to the rear end of the latter by means of a fitting 4 secured in the wall of the tubular casing, there being a lamp terminal contact for engaging an insulated contact 17, and the latter being connected with one pole of a battery by the flexible wire 18. The opposite pole of the battery may be connected by a conductor 19 with a contact 20 fixed on the trigger guard and in the path of the trigger $b$. The other lamp terminal may be earthed, that is to say in electrical contact with the stock, so that, when the trigger $b$ is pulled and contact made with the contact 20, the circuit is completed and the lamp is lighted. If desired, of course, a small switch might be operated by the trigger when the weapon is "fired". Behind the lamp bulb 2 there is fitted within the tube 1 an elliptical reflector 3 having the properties hereinafter mentioned and in advance of the lamp bulb there is a narrow annular reflector 5 arranged on the wall of the tube, this reflector forming part of a sphere with its concavity turned towards the concavity of the elliptical reflector 3. In advance of the annular reflector 5 is a second annular reflector 6 of slightly greater width and also forming part of a sphere and still further in advance there may be a reflector 8 formed as a concave disc with a small central aperture, this disc 8 also forming part of a sphere. The annuli 5 and 6 and the disc 8 together form a sectional spherical reflector which receives rays from the lamp 2 and reflects them back on to the elliptical reflector 3, the latter also receiving rays direct from the lamp. Some rays from the lamp 2 will strike the reflective surface of the first annulus 5 and some passing by the latter will strike the reflective surface of the second annulus, while practically the whole of the remainder of the rays in the forward direction will strike the reflective surface of the disc 8. The rays striking the elliptical reflector will all be reflected forwards through the central aperture in the spherical disc reflector and so that they come to a focus at a point $g$ in advance of that disc, i. e., the second focus of the ellipse. At this point $g$, or second focus of the ellipse, or the conjugate focus in the case of a spherical projector, a diaphragm 9 may be arranged, the diaphraghm having an aperture of suitable dimensions. If desired, the aperture may be adjustable as to size, but for ordinary purposes the diaphragm may simply be a disc with a central perforation. The disc 9 may be mounted in the tube by the aid of collimation screws 10, so that the disc may be adjusted to eliminate collimation. At a somewhat short distance in advance of the diaphragm there is arranged a gathering lens 11 adapted for gathering the rays diverging from the focus and projecting them forwards at a smaller angle of divergence and so that they will not strike against the interior wall of the tubular casing 1 before they arrive at a front lens 12 which is preferably adapted for projecting a parallel beam.

In the modification seen in Figure 2, there is an additional spherical reflector 7 disposed between the annulus 6 and the disc 8, and it will be understood that the spherical reflector may be a one-piece reflector, or a sectional reflector composed of any desired number of annuli. Also the projecting reflector 3 may be a spherical mirror using conjugate foci, or an elliptical mirror using its two foci. In the modification seen in Figure 2, moreover, a flange 14 or narrow diaphragm is arranged on the interior of the tubular casing 1 for the purpose of cutting off any wandering rays. There may be more than one of these flanges or diaphragms as will be apparent.

It may be arranged for a disc of light of substantial diameter, say between six and twelve inches, to be produced by the beam at a distance of, say, fifteen yards. It is possible, of course, to arrange crossed wires or other devices for producing a shadow indicating the centre of the disc of light, but it is believed that, in practice, a disc of light of the size indicated, and not necessarily sharply defined, will be found to be most advantageous. When a circular disc of light of this character falls upon the object aimed at, it is readily apparent how far a vital spot or bull on the object or target is eccentric to the disc.

For lighting the lamp, a battery of primary or secondary cells may be mounted in or on the fire arm, as for example in the butt thereof. Or a battery may be carried in the pocket or on the person and be suitably connected with the lamp as described with reference to Figure 1.

Preferably the electric circuit is normally broken and the "make" is so adjusted as to complete the circuit immediately the sear is disengaged when the trigger is pulled, the circuit being again broken on release of the trigger, as above described. This arrangement ensures the projection of the beam practically at the moment that the explosion would take place when firing off ammunition. Any disturbance of aim due to bad holding, or unbalancing due to the sudden release of the firing mechanism of the "arm" is shown in the resultant position of the flash or disc of light in its relation to the point aimed at.

Instead of the tubular projector being designed and weighted so as to be suited as a substitute for the barrel of a pistol, it may be designed and weighted so as to be suited as a substitute for a bayonet for a rifle. The training of an efficient soldier now includes the firing of the rifle from various positions as for example from the hip, with the bayonet in position, and quick snap shooting by throwing the rifle to the shoulder like a shot gun. Such a tubular projector therefore, serves a very useful purpose in reproducing exactly the conditions of firing with bayonet fixed.

Naturally, the tubular projector may be adapted for fitting to a rifle, machine gun, pistol, or any light weapon requiring quick aim in any convenient manner. Any suitable control for the light may be adopted and any portable light suitable for the conditions under which the weapon or device is to be used, may be employed. All reflectors may be of glass silvered, or of burnished metal or composition or both.

If a weapon fitted with a light projector, such as is herein described, be aimed at an observing station, the beam will be seen plainly only by a person at the said station. By operating the trigger or other means of controlling the beam according to any given code, therefore, the said weapon constitutes a very convenient and efficient signaling means as well as a means for training marksmen.

When using a tubular projector comprising a combination of reflectors as above described, it is preferred to employ a spherical reflector in annular sections arranged in series along the tube, as by this means the projector can be kept tubular throughout and the greatest possible amount of reflected light can be directed on to the elliptical or projecting mirror. An enlargement of the "light source" end of the tube would be necessary otherwise to obtain the same quantity of reflected light for projection. The elliptical or projecting reflector must be adapted for directing the rays to a point of focus in advance of the spherical reflector and for this purpose an elliptical reflector is most efficient owing to its well known properties.

The use of the improved means hereinbefore described, enables the training and practice of firing from the hip, or from other suitable positions, and without the use of sights, in the dark or twilight, or in dimly lighted rooms or chambers. Moreover, it enables instructors to observe readily the accuracy or otherwise of the shooting and to give such instruction and training under peace conditions as will fit the soldier or marksman for active warfare conditions. Finally, the aforesaid means are simple and inexpensive in themselves, and in their use, avoid the waste and inconvenience attaching to constant practice with ball cartridge only. There is no risk, and practice can take place anywhere.

I claim:—

1. In a device for teaching or practicing the aiming of fire arms, the combination of a barrel support, means to permit the detachable connection of a fire-arm barrel to the support, a tubular casing simulating the fire-arm barrel and interchangeable therewith, illuminant means within said casing, a projector combination in operative relation with the illuminant means and adapted for projecting a beam of light through the casing, and trigger mechanism operative for controlling the light projection.

2. A device for teaching or practicing the aiming of fire arms, comprising a tubular casing adapted for attachment to such fire arm in substitution of the normal barrel thereof, a weight adjustably mounted on said casing for the purpose of enabling approximate reproduction of the conditions of weight and center of gravity of such fire-arm, illuminant means within said casing, a projector combination in operative relation with said illuminant means and adapted for projecting a beam through said casing, and trigger mechanism operative for controlling the light projection.

3. In a device for teaching or practicing the aiming of fire arms, the combination of a barrel support, means to permit the detachable connection of a fire arm barrel to the support, a tubular casing simulating the fire arm barrel and interchangeable therewith, an electric lamp within said casing, a terminal contact fitting adapted for fitting on to the fire arm and for making electrical contact with the terminals of the lamp, an electrical circuit connection to said terminal contact fitting, a switch device in operative relation with the trigger of said fire arm, an electrical circuit connection to said switch devices, and a projector combination in operative relation with said electric lamp and adapted to project a beam through said casing from said lamp.

4. In a device for teaching or practicing the aiming of fire arms, the combination of a barrel support, means to permit the detachable connection of a fire arm barrel to the support, a tubular casing simulating the fire arm barrel and interchangeable therewith, illuminant means within said casing, an elliptical reflector arranged behind said illuminant means, a spherical reflector in front of said illuminant means and adapted to reflect rays of light therefrom on to said elliptical reflector, said spherical reflector having an aperture for the passage of the rays reflected by said elliptical reflector, a lens disposed in said casing forwardly of said spherical reflector, and trigger mechanism operative for controlling the projection of light from said casing.

5. In a device for teaching or practicing the aiming of fire arms, the combination of a barrel support, means to permit the detachable connection of a fire arm barrel to the support, a tubular casing simulating the fire arm barrel and interchangeable therewith, an illuminant means within said casing, a sectional spherical reflector arranged in advance of said illuminant means, said reflector being composed of a plurality of spaced annuli, a reflector at the rear of said illuminant means, said rear reflector being adapted for projecting a beam to a point of focus beyond the sectional reflector, the said beam being composed of rays received directly from the illuminant means and of rays received indirectly after reflection by the spherical reflector, a lens arranged in the casing in advance of the said point of focus and trigger mechanism for controlling the light projection from said casing.

LOUIS CLAUDE ALEXANDRE de BRIGNY DOUCET.

In the presence of—
DORA JONES,
JAMES HEARN.